W. S. LEVIS.
COMPOSITE FIGURE TOY.
APPLICATION FILED MAR. 23, 1918.
1,272,685.
Patented July 16, 1918.
2 SHEETS—SHEET 1.
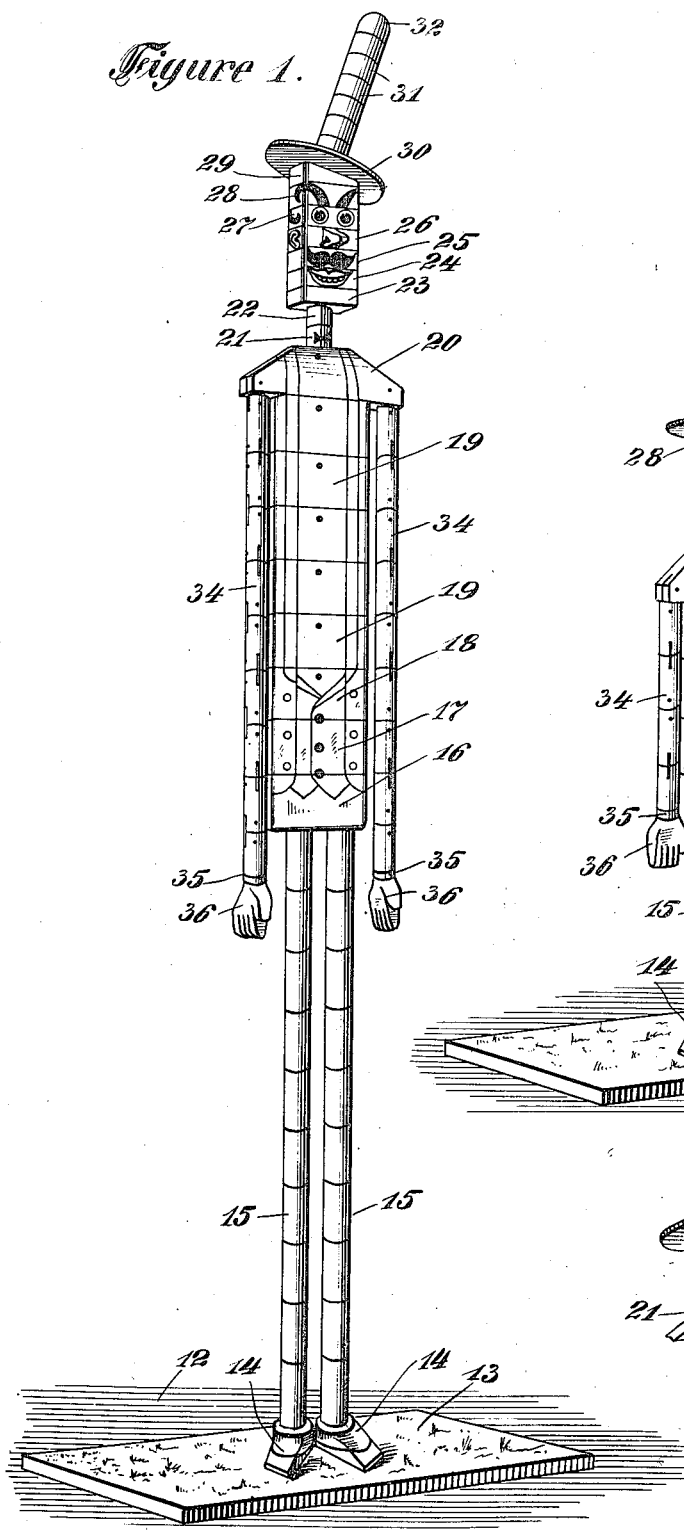
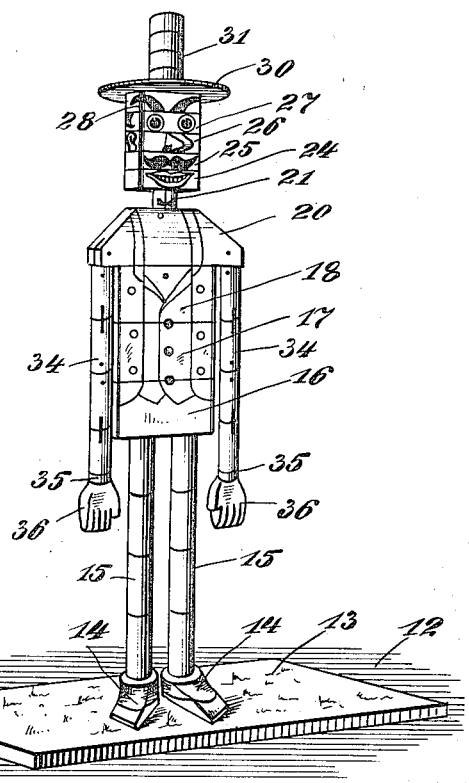
INVENTOR
Willis S. Levis
BY Walton Harrison,
his ATTORNEY

W. S. LEVIS.
COMPOSITE FIGURE TOY.
APPLICATION FILED MAR. 23, 1918.

1,272,685.

Patented July 16, 1918.
2 SHEETS—SHEET 2.

INVENTOR
Willis S. Levis
BY Walton Harrison,
his ATTORNEY

UNITED STATES PATENT OFFICE.

WILLIS SYLVESTER LEVIS, OF YONKERS, NEW YORK.

COMPOSITE FIGURE TOY.

1,272,685.　　　　　　　　Specification of Letters Patent.　　Patented July 16, 1918.

Application filed March 23, 1918.　Serial No. 224,141.

*To all whom it may concern:*

Be it known that I, WILLIS S. LEVIS, a citizen of the United States, residing in Yonkers, in the county of Westchester and State of New York, have invented certain new and useful Improvements in Composite Figure Toys, of which the following is a full, clear, and exact description.

The purpose of my invention is to produce a composite figure toy made up of separate units, so constructed and arranged that they may be placed together in different relations in order to simulate living figures of different sizes and proportions.

More particularly stated, I make use of a number of separate units of different shapes, the several units of each shape being of suitable form to be temporarily connected together end to end in order to build up various anatomical members such as arms, legs, face, neck and body trunk.

I further seek to give the various units such form that by using a large or a small number of them I can render the composite figure as a whole relatively large or small, and can also vary the grotesqueness of the figures thus formed by changing some of their proportions while leaving others of their proportions unchanged.

Reference is made to the accompanying drawings forming a part of this specification, and in which like letters indicate like parts in all of the figures.

Figure 1 is a perspective of my composite figure toy complete, the units being here placed together so as to simulate a man who is tall and slim.

Fig. 2 is a perspective of a composite figure representing a shorter man than the one shown in Fig. 1, and made up of a smaller number of units selected for the purpose.

Fig. 3 is a fragmentary perspective, showing a head and face built up with a smaller number of units than are employed for the purpose in Figs. 1 and 2.

Figure 4:
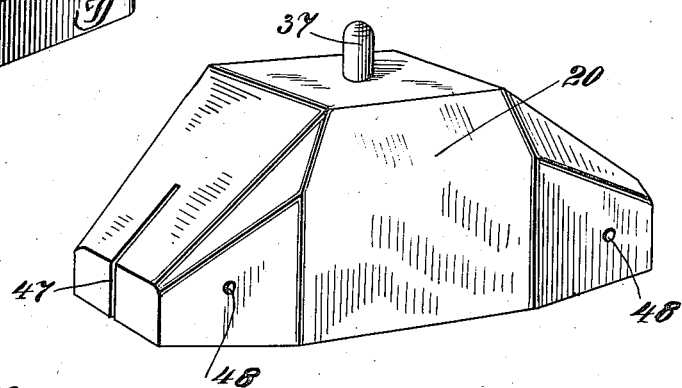
Fig. 4 is a perspective of one of the units used for building up the head and face of the composite figure.

I will first describe more particularly Fig. 1, as this shows a maximum number of the units.

A floor appears at 12, and resting loosely upon it is a base-board 13, serving the purpose of a pedestal. Secured firmly upon the base-board are two blocks 14, fashioned to roughly represent human feet.

Extending upwardly from these feet are a number of units 15, collectively forming the legs of the figure.

Resting upon the legs, and extending upwardly therefrom, are a number of body sections 16, 17, 18, 19, 20, differing slightly in form and collectively constituting the body trunk. There are one each of the units 16, 17, 18 and 20, but several units 19 may be employed. The unit 20 is a little wider than the other sections just mentioned, and supplies the shoulders.

Two units 21, 22 are used to form the neck, and a number of units 23, 24, 25, 26, 27, 28 and 29 together form the head and face.

A single unit 30, having the general form of a disk, represents a hat brim, and a number of units 31 are connected together to form a hat crown. A single unit 32 having substantially a hemispherical form is the top member of the hat crown.

Fig. 2 differs from Fig. 1 merely in the omission of a number of the units, and a consequent shortening of the composite figure as a whole. Since, however, the reduction in the height of Fig. 2 as compared with Fig. 1 is not accompanied by any change in the sizes of the units or in the relative proportions of any unit, it follows that the proportions of the composite figure shown in Fig. 2 must be different from those of the figure illustrated in Fig. 1. Thus the grotesqueness of the completed structure is enhanced.

It will be noted that in Fig. 1 a unit 29, representing a part of the forehead of the composite figure, is an angle block so proportioned that the hat of the figure inclines sidewise. In Fig. 3 a block 33 of slightly different form is used for causing the hat of the figure to lean backward.

A number of units 34 are connected together to form the arms of the composite figure. If the arms are to be lengthy, as shown in Fig. 1, or short as shown in Fig. 2, the number of units 34 is varied accordingly.

Two small disk-like units 35 represent the wrists, and two suitably shaped blocks 36 are used to simulate the hands, of the composite figure.

Figures 9, 10:
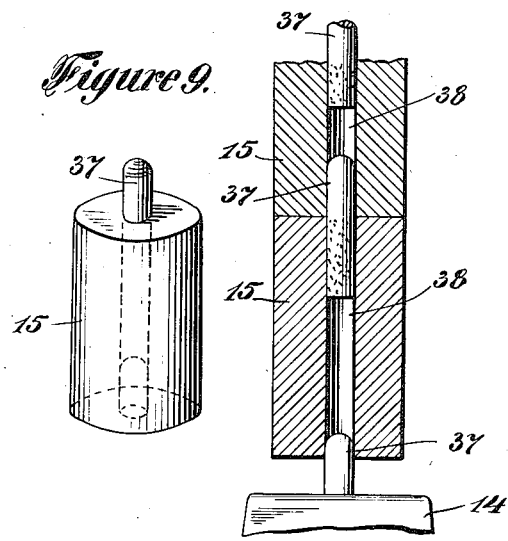
Fig. 9 is a perspective of a unit used as a section of one of the legs of the composite figure.
Fig. 10 is a sectional view showing units of the kind appearing in Fig. 9, and indicating the manner in which they are connected to form one of the legs.
Figure 11:
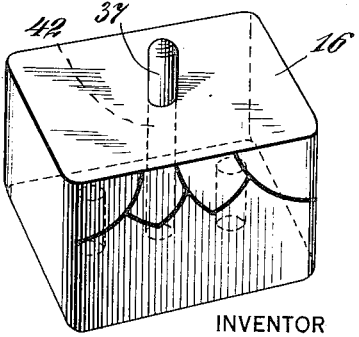
Fig. 11 is a perspective of one of the units used in building the body trunk.

In order to connect various kinds of units together, I use a number of separate connecting pins 37, which fit into holes 38, the latter extending axially through the units, as indicated more particularly in Figs. 9 and 10. Each connecting pin is roughened, if so desired, in order to improve its anchorage.

Figures 6, 7:
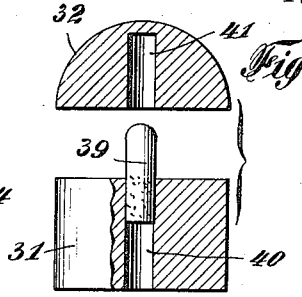
Fig. 6 is a perspective of two units adapted to be connected as a part of an arm.
Fig. 7 shows in section two units differing slightly from each other and used together to form a part of the hat of the composite figure.
Figure 8:
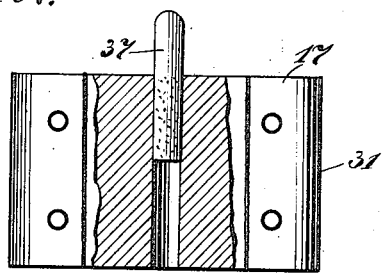
Fig. 8 is a front elevation of a unit used as a section of the body trunk.

In the units 31 and 32, serving as hat members, I use shorter connecting pins, one of which is shown at 39 in Fig. 7. This pin fits into holes 40, 41, as may be understood from Fig. 7.

Each unit 34, used for the arms, carries a metallic plate 42, provided with a hole 43. The plate 42 is held in a slot, by a pin 44 extending diametrically through the unit. Each unit 34 is also provided with a slot 45, for receiving the protruding portion of the plate 42 of the next successive unit below it, as may be understood from Fig. 6. Each unit 34 also carries a pin 46, so arranged that it may be thrust through the hole 43 of the plate 42 carried by the next successive unit of the same kind.

In order to disconnect any unit 34 from the next successive unit of the same kind, all that is necessary is to pull out one of the pins 46 as indicated in Fig. 6.

The unit 26 carries an extending portion 41, shaped as a nose.

The various units are colored or decorated as shown, in order to adapt them to simulate the various anatomical parts which they are used to simulate.

Figure 5:
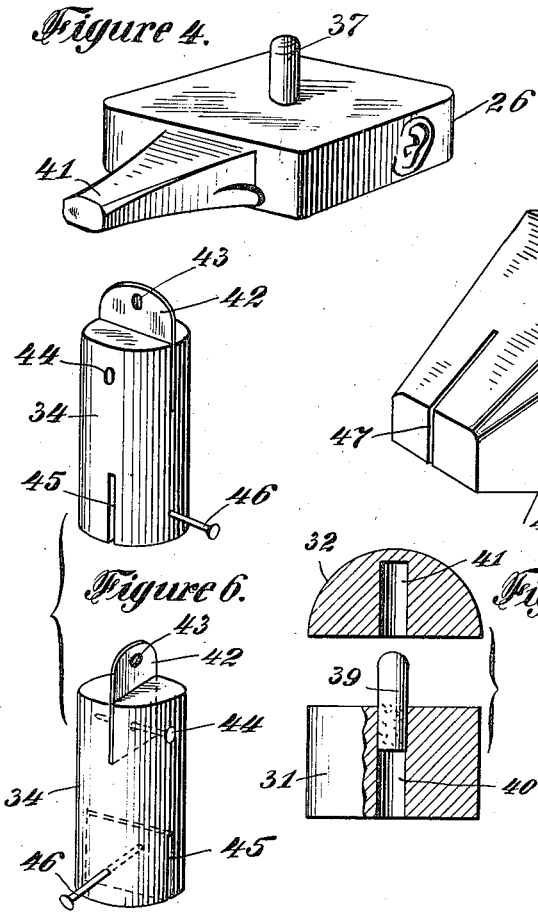
Fig. 5 is a perspective of the unit used for the shoulders and the upper portion of the body trunk.

The unit 20 is provided with two oppositely disposed slots, one of which is shown at 47, in Fig. 5. Each unit 20 is further provided with a hole 48, crossing the adjacent slot 47. Hence, by placing a unit 34 immediately below each end of the unit 20 and thrusting into each slot 47 the extending portion of the plate 42 carried by such unit 34, the hole 43 may be brought into registry with the hole 48. This done, the parts are held in position by thrusting one of the pins 46 through each hole 48, and consequently through each hole 43. Thus the upper units of the arms of the composite figure are hung from the unit 20.

To assemble the parts of the composite figure, the various units of different kinds are picked out and grouped collectively, so as to form the legs, arms, body trunk, neck, hat, etc., the various parts thus grouped being arranged together to form the composite figure.

I do not limit myself to the precise mechanism here shown, as variations may be made therefrom without departing from the spirit of my invention, the scope of which is commensurate with my claims.

I claim:—

1. A composite figure toy, made up of separate units detachably connected together and arranged in distinct groups corresponding to anatomical members, the number of units in each group being variable at the will of the operator for the purpose of changing the lengths of the respective anatomical units.

2. In a composite figure toy, the combination of a number of separate units and means for connecting them together to form a member having a length equal to the aggregate length of the several units, the number of such units employed being variable at the will of the operator in order to vary the length of said member, said units being so shaped and having such appearance as to simulate, when connected together, a definite portion of a living figure.

3. The combination of a number of separate units having a plurality of different forms, the units of each form being provided with means whereby they may be detachably connected to each other to build up an elongated member having any desired length dependent upon the number of units of which it is thus built up, the several units of each form having such appearance that the elongated member built up of units of one form simulates one distinct portion of a living figure and the elongated member built up of units of another form simulates another distinct portion of said living figure.

4. In a composite figure toy the combination of a number of separate units having a plurality of distinct forms, the units of each form being provided with means whereby they may be detachably connected to each other to build up an elongated member, the length of each elongated member being controllable at the will of the operator by choosing the aggregate number of units of which the elongated member is built up, the various units in the different elongated members having such appearance that the elongated members respectively simulate distinct parts of a living figure.

5. In a composite figure toy the combination of a number of separate units having a plurality of distinct forms, the units of each form being provided with means whereby they may be connected to each other in order to build up an elongated member, the length of which is controllable by choosing the aggregate number of units of which it is composed, the units composing each elongated member having such size and appearance that one elongated member simulates one portion of a living figure, and another elongated member simulates a different portion of said living figure.

6. In a device of the character described a member simulating a living face of grotesque appearance and comprising units detachably fitting together one over the other and having such appearance that the operator, by discretionary selection of the number and kind of such units, can at will vary the length of the face independently of the width thereof.

7. In a composite figure toy, a figure provided with a portion simulating a living face of grotesque appearance, said portion comprising units fitting together in different relations and having such appearance that the operator, by discretionary selection of the number and kind of such units, can at will vary the length of the face.

8. A composite figure toy, comprising a figure provided with a member simulating a body trunk, said member being built up of separate units having such appearance that the length of said body portion may be varied at the will of the operator by choosing the number of units of which it is thus built up.

9. A composite figure toy provided with an articulate member simulating a limb and made up of separate units connected together, the units having such form and appearance that the length of said limb can be controlled at will by selection of the number of units of which it is built up.

10. A composite figure toy provided with an articulate member simulating an arm and made up of separate units detachably connected together, said units having such form and appearance that the length of the arm can be varied at the will of the operator, by appropriate selection of the number of units of which it is composed.

11. In a device of the character described a member simulating a hat and built up of distinct units detachably fitting together one over another and having such appearance that the operator, by discretionary selection of the number of such units, can give the hat any desired height dependent upon the number of units employed.

12. A device of the character described, comprising an inanimate figure representing a living figure and provided with distinct members simulating different anatomical portions thereof, said distinct members each being built up of separate units detachably connected together, the several units of each member being so related in size and appearance that by varying the number of units in each member the respective lengths of the several members may be varied at will so as to vary the general size of the inanimate figure.

WILLIS SYLVESTER LEVIS.